United States Patent

[11] 3,614,679

[72] Inventors Marc-Aurele Nicolet
Pasadena, Calif.;
Hans Rudolf Bilger, Stillwater, Okla.
[21] Appl. No. 829,518
[22] Filed June 2, 1969
[45] Patented Oct. 19, 1971
[73] Assignee California Institute of Technology
Pasadena, Calif.

[54] DOUBLE INJECTION INDUCTOR
7 Claims, 4 Drawing Figs.

[52] U.S. Cl. .......... 333/80 T, 307/317, 307/322, 317/235 (25)
[51] Int. Cl. .......... H03h 11/00
[50] Field of Search .......... 333/80; 331/115; 307/88.5–258; 317/235 (25)

[56] References Cited
UNITED STATES PATENTS
3,178,662 4/1965 Dill et al. .......... 333/80
3,408,600 10/1968 Jordan .......... 333/80
OTHER REFERENCES
" Double Injection and High-Frequency Noise in Germanium Diodes" by F. Driedonks Applied Physics Letters, 15 Nov. 1967 Vol. 11, Number 10, pages 318 and 319, copy in Group 250, 317–235/25 Lit.

*Primary Examiner*—Herman Karl Saalbach
*Assistant Examiner*—Saxfield Chatmon, Jr.
*Attorney*—Lindenberg, Freilich & Wasserman

ABSTRACT: A circuit, incorporating a variably bistable double-injection diode to provide a high Q inductance, is disclosed. The circuit's inductance is the inductance exhibited by the double-injection diode, which is a function of the diode's biasing potential. The high Q property is realized by incorporating in the circuit devices or circuits which provide negative resistances to compensate for the positive resistive characteristics of the double-injection diode.

MARC-AURELE NICOLET
HANS RUDOLF BILGER
*INVENTORS*

BY Lindenberg & Freilich

ATTORNEYS

DOUBLE INJECTION INDUCTOR

BACKGROUND OF THE INVENTION

1. Field of the Invention

The present invention relates to an inductive circuit component and, more particularly, to a circuit incorporating a double-injection solid-state element, which is bistable to perform as an inductor of a selected inductance value.

2. Description of the Prior Art

A component which exhibits inductive properties, known as an inductor, represents one of the basic components, used in circuit design. Although some efforts have been directed to provide components with inductive properties by means of elaborately designed electronic systems, at present, nearly all inductors are in the form of discrete components comprising wound coils of conducting wires. This is particularly true for inductors with large inductance values, in the order to one or more Henries, or in the case of inductors with variable inductance values, i.e., variable inductors.

An inductor in the form of a wound coil has a few inherent disadvantages. One of the major disadvantages is the magnetic field which is present about the inductor as current flows therethrough. Such a field produces magnetic cross coupling to adjacent components. Also, a coil-type inductor is of significant size and weight, particularly one having a large inductance value. Another disadvantage of a coil-type inductor is in its compatibility with integrated circuit techniques, which are at present extensively employed to reduce the size and weight of completed circuits. A further disadvantage of a coil-type inductor is its inherent inability to change its inductance values by other than mechanical means. Thus, a need exists for a new circuit component with inductive properties, similar to those exhibited by a coil-type inductor, but one which is not limited by the disadvantages characterizing a conventional coil-type inductor.

OBJECTS AND SUMMARY OF THE INVENTION

It is a primary object of the present invention to provide a circuit which possesses inductive properties without employing a coil-type component.

Another object of the present invention is to provide a reliable, relatively small and lightweight circuit, capable of exhibiting an inductance value up to one or more Henries.

A further object of the present invention is to provide a circuit, capable of exhibiting a selected inductance value, and one which is small, lightweight and compatible with integrated circuit techniques.

Yet a further object of the present invention is to provide a circuit which is capable of providing an inductance of a value which is variable over a broad range by electronic means, and one which does not produce a magnetic field of the type produced by a coil-type inductor.

These and other objects of the invention are achieved by incorporating a double-injection diode, which has inductive and resistive characteristics, in a circuit to provide the desired inductance value. The circuit may be made to provide high Q inductivity by incorporating therein an active network, designed to minimize the overall effect of the resistive characteristics of the double-injection diode, which accounts for energy losses therein. The circuit may be designed to act as a pure inductor with no or at leas minimal losses. The actual inductance value which the circuit exhibits may be adjusted over a relatively wide range by adjusting the diode's bias voltage, as will be explained hereafter in detail.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
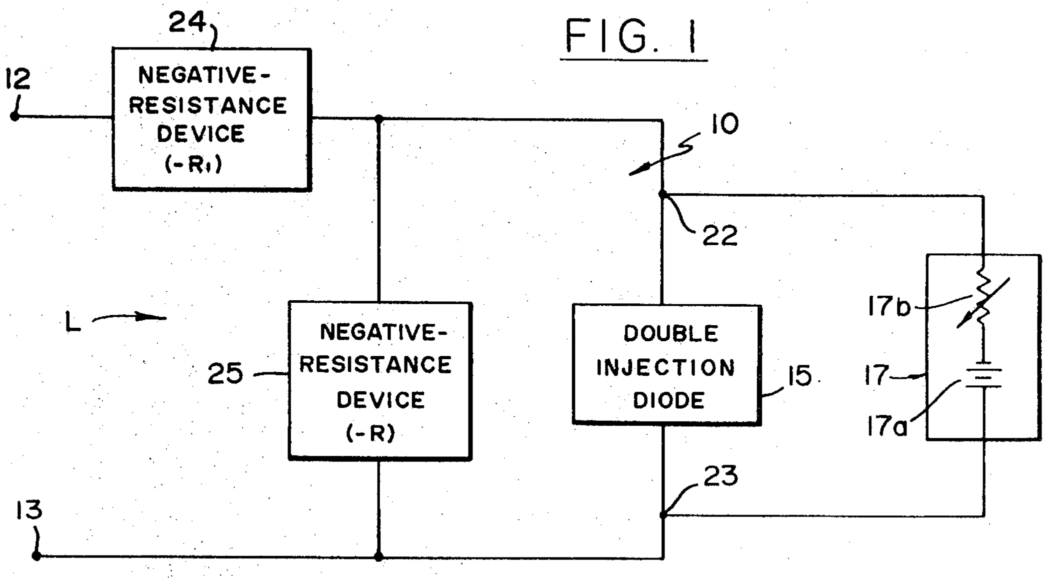
FIG. 1 is a simplified block diagram of an inductor circuit, in accordance with the teachings of the present invention.

Referring to FIG. 1, therein reference numeral 10 designated a preferred embodiment of the novel circuit of the present invention, shown connected across terminals 12 and 19. The basic function of the circuit 10 is to provide an inductance L across the two terminals. The basic novelty of the circuit 10 resides in the incorporation therein of a two-terminal double-injection solid-state element, such as a double-injection diode 15, which is biased by a voltage from a source 17 connected across it. For explanatory purposes source 17 is shown comprising a battery 17*a*, connected in series with a variable resistor 17*b*. The bias voltage applied by the source may be adjusted by adjusting the resistance of resistor 17*b*.

In the particular embodiment, shown in FIG. 1, one terminal of the diode, designated by numeral 11, is connected to circuit terminal 12 through a negative-resistance-producing device 24, while the opposite terminal of the diode, designated by numeral 23, is directly connected to circuit terminal 13. A second negative-resistance-producing device 25 is connected in parallel across the diode 15. Any known negative-resistance-producing device may be employed as either device 24 or 25. One example of a negative-resistance-producing device is a negative impedance converter. Another example of means which may be used to provide the desired negative resistance is a tunnel diode. Thus, as used hereafter, the term "-negative-resistance-producing device" or means is intended to describe any circuit or arrangement, capable of producing the desired negative resistance.

As is appreciated by those familiar with solid state physics, double-injection is used to define the simultaneous injection of electrons from a negative contact and holes from a positive contact into a solid. Thus, a double-injection diode may be thought of as a two-terminal solid state body in which mobile positive charge carrier (holes), and negative charge carriers (electrons) are present, simultaneously. The two terminals are used to inject the positive and negative charge carriers into the diode. The injection is produced by connecting the two terminals of the diode to an appropriate bias voltage source, such as source 17.

In recent years the double-injection phenomenon has been studied. Some of the study results have been published in several articles, which appeared in the Journal of Applied Physics and in Applied Physics Letters. In an article by Albert Rose entitled, "Comparative Anatomy of Models for Double-Injection of Electrons and Holes into Solids," appearing in the Journal of Applied Physics, volume 35, pp. 2,664, a number of double-injection diodes are listed and discussed. One method of fabricating a PN double-injection diode is also described in an article by S. T. Liu et al. entitled, "Noise in Double-Injection Space-Charge Limited Diodes," published in Applied Physics Letters, volume 10, p. 308.

Figure 2:
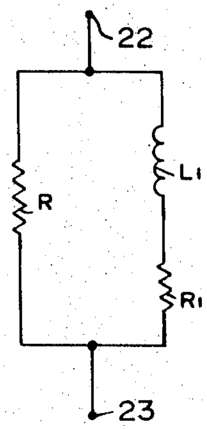
FIG. 2 is a schematic diagram of an equivalent circuit of the double-injection diode, shown in FIG. 1.

In studying the double-injection phenomenon in solids it has been discovered that the electrical characteristics of a double-injection diode may be represented by an equivalent circuit, as shown in FIG. 2 to which reference is made herein. For diode 15, the equivalent circuit may be represented by an inductor $L_1$ connected in series with a resistor $R_1$ across the diode's terminals 22 and 23, while a resistor R is connected in shunt across the two terminals. The resistances of R and $R_1$ are positive and they represent losses of energy in the diode, similar to the losses in a conventional coil-type inductor due to the resistance of the wire, which is coiled to form the inductor. To minimize such losses, the circuit 10 (FIG. 1) incorporates the two negative-resistance-producing devices 24 and 25. Device 24 is adjusted to provide a negative resistance equal to $R_1$, while device 25 is adjusted to minimize the effect of the positive resistance of R by providing an equal but negative resistance R.

It has been determined that for each double-injection diode the values of $L_1$, $R_1$ and R are a function of the bias potential which is applied across the diode's two terminals. It has been discovered that for each bias setting the values of $L_1$, $R_1$ and R may be derived by measuring the initial and final current flowing through the diode in response to a voltage pulse, and by determining the diode's average time constant $\bar{\tau}$.

In one particular study the values of $L_1$, $R_1$ and R were derived for a variably biased double-injection diode constructed of high-purity silicon in the shape of a rectangular block or prism of 3.1mm.×3.2mm., 6.0mm. long with 1.1×10 $^{12}$cm.$^{13}$ P-type doping. One end of the block served as an aluminum alloyed contact while the opposite end was a lithium alloyed contact.

At each bias setting the diode was subjected to a succession of identical voltage pulses. The initial and final currents, in response to each pulse, were measured as well as the time constant $\tau$. From these measurements the values of R, $R_1$ and $L_1$ were derived based on the following relationships:

$$R=\frac{V_{\text{pulse}}}{I_{\text{initial}}} \qquad (1)$$

$$R_1=\frac{V_{\text{pulse}}}{I_{\text{final}}-I_{\text{initial}}} \qquad (2)$$

and $$L_1=\bar{\tau}.R_1 \qquad (3)$$

In equation (3) $\bar{\tau}$ represents the average of several measured time constants $\tau$. Actually, the initial and final currents were measured by measuring the voltage drops across a 100 Ω resistor which was connected in series with the diode. With a 1-volt pulse, the voltage drop across the resistor was always less than 1 percent. Consequently, the effect of this voltage drop across the resistor was neglected.

Figure 3:
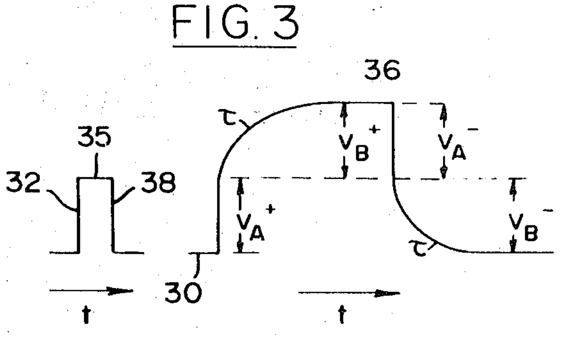
FIG. 3 is a diagram of voltage vs. time, useful in explaining a technique for measuring the resistance and inductance characteristics of a double-injection diode.

The voltage drop across the resistor in response to a positive 1-volt pulse varied as shown in FIG. 3 to which reference is made herein. Therein, $V_A^+$ represents the initial increase of the voltage across the resistor from a reference level 30, which occurred in response to the positive leading edge 32 of a 1-volt pulse, designated in FIG. 3 by numeral 35. The voltage drop (and therefore the current in the resistor) continued to rise as indicated by line 36 until it reached a final value of $V_B^+$ above $V_A^+$. $\tau$ represents the time required for $V_B^+$ to reach approximately 66 percent of its final value. In FIG. 3 $V_A^1$ represents the initial decrease in the voltage drop across the resistor which occurs coincidentally with the negative trailing edge 38 of pulse 35 and $V_B^+$ is the final voltage drop across the resistor.

The values of R and $R_1$ may be expressed in terms of these voltage drops as follows:

$$R=\frac{V_{\text{pu'se}}}{I_{\text{initial}}}=\frac{V_{\text{pu'se}}}{\frac{V_A}{100}}=\frac{1\text{ volt}}{\left(\frac{V_A^{+}+V_A^{-}}{2}\right)}100\ \Omega$$

$$R_1=\frac{V_{\text{pulse}}}{I_{\text{final}}-I_{\text{initial}}}=\frac{V_{\text{p'ilse}}}{\frac{V_B}{100}}=\frac{1\text{ volt}}{\left(\frac{V_B^{+}+V_B^{-}}{2}\right)}100\ \Omega$$

In the particular study the bias voltage across the diode was varied from 10 to 30 volts in 5-volt increments. The measured voltage drops were as listed in the following chart I.

CHART I

| $V_{diode}$ | $F_A^+$ mV | $V_A^1$ mV | $V_B^+$ mV | $F_B^1$ mV | $\bar{\tau}$ µs |
|---|---|---|---|---|---|
| 10 | 2.02 | 2.22 | 1.30 | 1.14 | 36.7 |
| 15 | 2.80 | 2.99 | 2.39 | 2.20 | 36.7 |
| 20 | 3.61 | 3.87 | 3.51 | 3.22 | 36.7 |
| 25 | 4.60 | 4.83 | 4.59 | 4.28 | 36.7 |
| 30 | 5.46 | 5.59 | 5.56 | 5.24 | 36.7 |

From these measurements the values of R, $R_1$ and $L_1$ for the various bias settings were calculated as shown in the following chart II.

CHART II

| $V_{diode}$ | R kΩ | $R_1$ kΩ | $L_1$ Hy |
|---|---|---|---|
| 10 | 47.1 | 80.9 | 3.00 |
| 15 | 34.5 | 43.5 | 1.60 |
| 20 | 26.7 | 29.7 | 1.09 |
| 25 | 21.2 | 22.5 | 0.829 |
| 30 | 18.1 | 18.5 | 0.679 |

From the foregoing and in particular the right-hand column of chart II it should be appreciated that the double-injection diode, when properly biased, is capable of providing a high inductance, up to several henries. An inductance of 3 henries is realized when the particular diode, herebefore described, is biased by 10 volts. Furthermore, it should be appreciated that the inductance value is variable over a significant range as a function of the change in the biasing potential.

The results of the study of a particular diode have been presented, herebefore; for explanatory purposes only. It should be appreciated that the measured values would be different for different double-injection diodes. Thus, the invention is not intended to be limited to the particular diode, herebefore described. Rather, the invention includes any double-injection diode whose resistances R, $R_1$ and inductance $L_1$ are derivable from theoretical considerations alone, by the measurement technique, herebefore described, or by any other analogous technique, such as measurement of differential impedance as a function of frequency.

It is apparent from chart II that the values of R and $R_1$ vary as a function of the diode's bias voltage. Thus, in order to provide a high Q inductance it may be necessary to control the negative-resistance-producing devices 24 and 25 (FIG. 1), as a function of the diode's bias voltage to adjust the compensating negative resistance which each device provides, depending on the particular biasing voltage which is applied to the diode. Such control may be provided by connecting the diode bias source 17 and the two negative-resistance-producing devices to an appropriate control unit.

From the foregoing it should thus be appreciated that the novel circuit 10, which incorporates a double-injection diode, is capable of exhibiting a high inductance between its two terminals 12 and 13. By eliminating or at least minimizing losses by means of the negative resistance elements which eliminate or at least reduce the losses due to resistors R and $R_1$, the device is adjustable to exhibit a very high Q. Furthermore, the inductance of the circuit is adjustable over a relatively wide range by merely adjusting the diode's bias voltage. Such bias adjustment is easily realizable with electronic means, thereby eliminating the end for switches or other mechanical devices which have been used in the prior art to vary the inductance of a variable inductor.

Since the circuit utilizes a solid-state double-injection diode, to provide the inductance rather than a coil-type inductor, the device does not produce magnetic fields. Thus, the problems created by magnetic field cross couplings are eliminated. Also, the device of the present invention can be constructed to occupy a small volume, is of small weight and can be constructed to be compatible with integrated circuit techniques.

Figure 4:
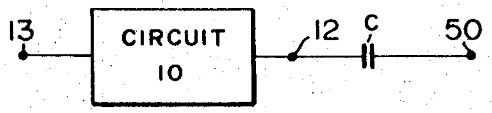
FIG. 4 is a simple diagram of the use of the circuit shown in FIG. 1 in a series resonance LC circuit.

Circuits, like circuit 10 may be operated over a wide frequency range in the tens of megahertz. Such a circuit may in turn be incorporated in various circuits such as power supplies, telephone communication system, filters and the like in which at present coil-type inductors are employed. For example, as shown in FIG. 4 to which reference is now made, the circuit 10 may be connected in series with a capacitor C, to provide an LC series network between terminal 13 and a terminal 50. As is appreciated such a network would resonate at a resonant frequency $f_r$, where $$f_r=\frac{1}{2\pi\sqrt{L_1C}}$$

L is in henries, C in farads and $f_r$ in cycles per second. Since the present invention is directed to a solid-state inductive device incorporating a double-injection diode, rather than to circuits in which such a device may be employed, such circuits will not be described herein.

There has accordingly been shown and described herein a novel circuit for providing high Q inductance between a pair of terminals. The device includes a double-injection solid variably bistable diode to provide the desired inductance. By incorporating in the device negative resistance elements to compensate for positive resistances of the double-injection solid, the inductance across the terminals is adjustable to have a high Q.

What is claimed is:

1. An inductive circuit comprising:

first and second circuit terminals;

a two terminal body of solid-state matter capable of having simultaneously present therein mobile positive and negative charge carriers thereby exhibiting positive resistances and inductance characteristics;

bias potential means coupled across said body for applying a bias potential across said body to inject positive and negative charge carriers thereinto, to control the magnitudes of its positive resistances and inductance; and means for coupling said body to said first and second circuit terminals to provide an inductance thereacross, which is equal to the inductance of said body, said means for coupling including means for providing negative resistances of magnitudes related to the magnitudes of the positive resistance of the body, said bias potential means including means for varying the bias potential applied across said body to control the magnitudes of the inductance and positive resistances exhibited by said body.

2. An inductive circuit comprising:

first and second circuit terminals;

a two-terminal body of solid-state matter capable of having simultaneously present therein mobile positive and negative charge carriers thereby exhibiting positive resistances and inductance characteristics;

bias potential means coupled across said body for applying a bias potential across said body to inject positive and negative charge carriers thereinto, to control the magnitudes of its positive resistances and inductance; and means for coupling said body to said first and second circuit terminals to provide an inductance thereacross, which is equal to the inductance of said body, and said two-terminal body being representable by a network comprising first and second parallel branches connected across its two terminals, said branch consisting of a first resistor connected between the two terminals and said second branch consisting of an inductor in series with a second resistor connected across the two terminals, the magnitude of said inductor and the magnitudes of the positive resistances of said first and second resistors being a function of the bias potential across said body, and said means for coupling include means for providing negative resistances whose magnitudes are related to the magnitudes of the positive resistances of said first and second resistors.

3. The arrangement as recited in claim 4 wherein said means for coupling include a first device connected in parallel across said body for providing a negative resistance of a magnitude related to the magnitude of the positive resistance of said first resistor, and a second device, connected in series between said second circuit terminal and one terminal of said body, to provide a negative resistance of a magnitude related to the magnitude of the positive resistance of said second resistor.

4. The arrangement as recited in claim 5 wherein said bias potential means include means for varying the bias potential applied across said body to control the magnitudes of the inductance and positive resistances exhibited by said body.

5. An inductive circuit comprising:

a double-injection diode, having first and second diode terminals and having the characteristics of an inductor connected in series with a first resistor between said first and second diode terminals and a second resistor connected to said first and second diode terminals;

bias means for applying a bias potential across the first and second diode terminals;

first and second circuit terminals; and resistance means coupled to said circuit terminals and to said diode terminals for compensating for the resistance values of the first and second resistors, forming part of the diode's electrical equivalence, with said diode exhibiting an inductance characteristic across said circuit terminals which is a function of the diode's bias potential, said resistance means including first means coupled between said first diode terminal and said first circuit terminal for providing a negative resistance which is substantially equal to the resistance of said first resistor, and second means coupled in parallel with said diode for providing a negative resistance which is substantially equal to the resistance of said second resistor.

6. The arrangement as recited in claim 5 wherein the inductance across said circuit terminals includes an inductance value of several henries.

7. The arrangement as recited in claim 5 wherein said bias means include means for varying the bias potential across said diode to control the inductance across said circuit terminal to vary from less than 1 henry to several henries.